(No Model.)
H. R. WALLACE.
NECK YOKE.
No. 279,847. Patented June 19, 1883.
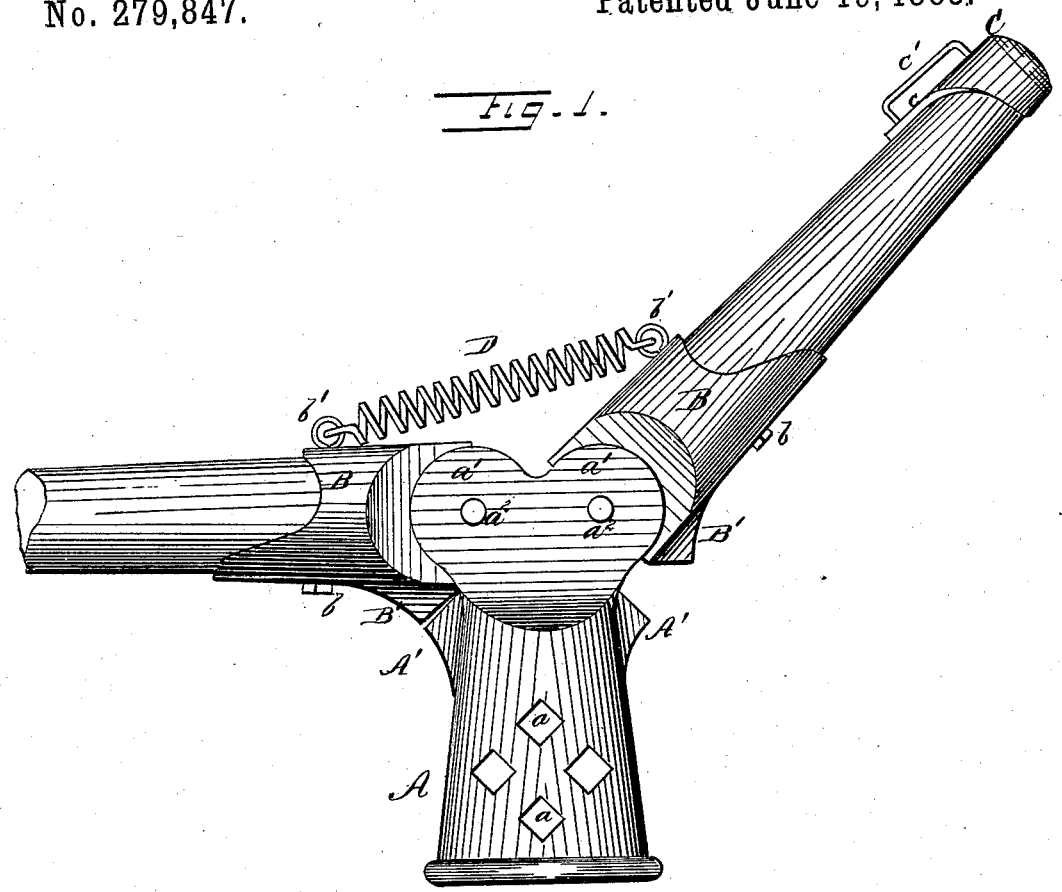
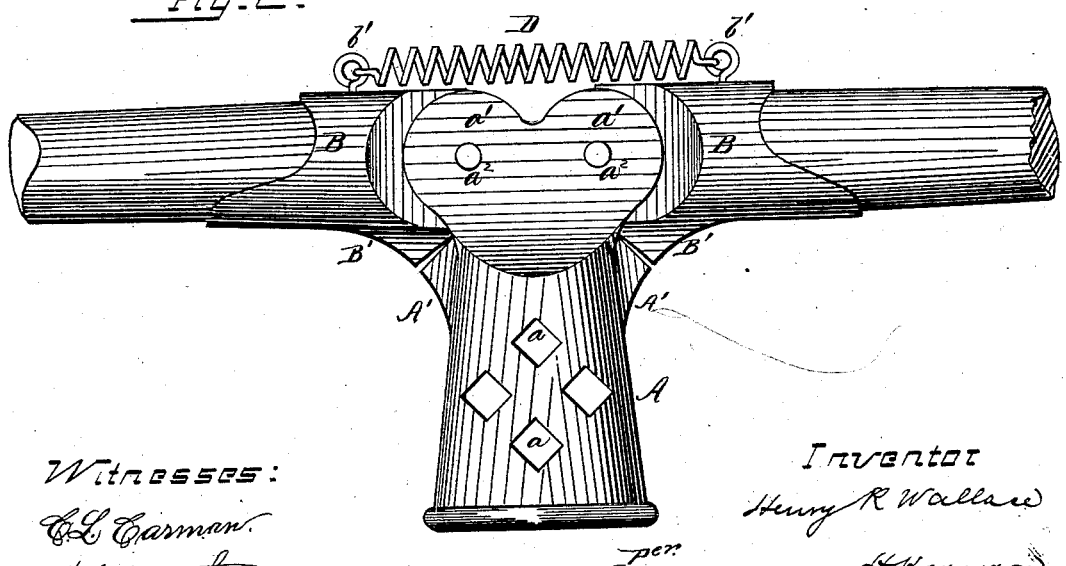
Witnesses:
C. L. Carman
H. C. McArthur
Inventor
Henry R Wallace
per
H Harmon
Attorney

UNITED STATES PATENT OFFICE.

HENRY R. WALLACE, OF CHICAGO, ILLINOIS.

NECK-YOKE.

SPECIFICATION forming part of Letters Patent No. 279,847, dated June 19, 1883.

Application filed January 18, 1883. (No model.)

*To all whom it may concern:*

Be it known that I, HENRY R. WALLACE, a citizen of the United States of America, residing at Chicago, in the county of Cook and State of Illinois, have invented certain new and useful Improvements in Neck-Yokes for Vehicles, of which the following is a specification.

This invention relates to neck-yokes for wagon-poles; and it consists in the peculiarity of construction and arrangement of the same, substantially as will be hereinafter more fully set forth.

In order to enable others skilled in the art to which my invention appertains to make and use the same, I will now proceed to describe its construction and operation, referring to the accompanying drawings, in which—

Figure 1 is a plan view of my invention, showing one arm of the yoke thrown forward; and Fig. 2 is a similar view, showing both arms thrown back.

A represents a tip or thimble cast with openings $a\ a$, which admit of the access of air to the pole, and prevent it rotting, as well as make a lighter and more economical casting. The outer end of this thimble is formed with lips or projections $a'$ on each side, between which are pivoted by pivots $a^2$ the sockets B, in which the two sections of the neck-yoke are secured by a bolt, $b$, passing entirely through the socket, and formed with an eye, $b'$, on the outer end. The rear sides of these sockets are formed with lugs $B'$, which, when the sections of the yoke are drawn back, abut against similar lugs, $A'$, upon the thimble and make the connection between the yoke and pole rigid.

The outer ends of the yoke-sections are provided with strengthening-caps C, which are formed on the forward side with an arm, $c$, extending inward along the yoke, forming a wearing-surface for the breast-strap, and to which are firmly secured the loops $c'$, through which these straps are passed.

The eyes $b'\ b'$ of the two yoke-sockets are connected by a spiral spring, D, as shown, which acts to throw the two sections of the yoke forward upon their pivots. The yoke thus formed makes a rigid and firm one, which, by always inclining forward, keeps the breast-straps tight, and yet gives readily to the motion of the animals, while the impossibility of twisting the yoke at an angle across the tongue enables me to use a much shorter pole without allowing one horse to lag so much as to bring it in contact with the vehicle. The yokes are, when in use, normally in a position in which the lugs $B'\ A'$ do not quite meet, and when the pole sways to one side it is stopped before it strikes the animal upon that side by the contact of the lugs upon the yoke and pole on the opposite side, making thereby a rigid connection. In this position also the distended spring D acts as a buffer over the end of the pole, and prevents much of the injury it usually does in case of a collision.

In speeding horses upon a curved track, if, as frequently occurs, the outside horse should stumble and lag behind, the rigid bearing of the yoke and pole enables the other horse to aid him in recovering. The thimble will also turn upon the pole if one animal should fall, and in many cases prevent the breaking of the pole and harness by suddenly pulling it down.

Having thus fully described my invention, what I claim as new, and desire to secure by Letters Patent, is—

1. In a neck-yoke for vehicles, the combination, with the thimble A, having lugs $A'$, of the pivoted sockets B and their lugs $B'$, substantially as shown and described.

2. In a neck-yoke for vehicles, a yoke made in two sections pivoted to the pole and connected by a spiral spring across the outer end of the pole, substantially as described and shown.

3. In a neck-yoke for vehicle-poles, the thimble A, formed with lugs $A'$ and lips $a'$, in combination with the sockets B, having lugs $B'$, adapted to engage with the lugs upon the thimble, and provided with eyebolts $b$, connected by a spiral spring, D, substantially as and for the purpose set forth.

In testimony whereof I affix my signature in presence of two witnesses.

HENRY R. WALLACE.

Witnesses:
J. E. STEVENSON,
FRANK JOHNSON.